United States Patent
Ivanov (10) Patent No.: US 8,674,663 B2
(45) Date of Patent: Mar. 18, 2014

(54) CONVERTER AND METHOD FOR EXTRACTING MAXIMUM POWER FROM PIEZO VIBRATION HARVESTER

(75) Inventor: Vadim V. Ivanov, Tucson, AZ (US)

(73) Assignee: Texas Instruments Incorporated, Dallas, TX (US)

(*) Notice: Subject to any disclaimer, the term of this patent is extended or adjusted under 35 U.S.C. 154(b) by 712 days.

(21) Appl. No.: 12/661,578

(22) Filed: Mar. 19, 2010

(65) Prior Publication Data
US 2011/0227543 A1 Sep. 22, 2011

(51) Int. Cl.
*H02J 7/00* (2006.01)
*H02J 7/04* (2006.01)

(52) U.S. Cl.
USPC ........... 320/163; 320/107; 320/137; 320/127; 320/114; 320/103

(58) Field of Classification Search
USPC ......... 320/163, 140, 166, 134, 127, 119, 101, 320/136, 118, 114, 115, 107, 137, 103, 145
See application file for complete search history.

(56) References Cited

U.S. PATENT DOCUMENTS

| | | | |
|---|---|---|---|
| 5,773,958 A * | 6/1998 | Gow et al. | 320/118 |
| 6,522,048 B1 | 2/2003 | Burns et al. | |
| 2004/0004464 A1* | 1/2004 | Tsukamoto et al. | 320/162 |
| 2004/0263127 A1* | 12/2004 | Turner et al. | 320/166 |
| 2008/0174926 A1* | 7/2008 | Evans et al. | 361/90 |
| 2008/0252174 A1 | 10/2008 | Mohammadi et al. | |
| 2009/0051330 A1* | 2/2009 | Hoshikawa et al. | 320/166 |
| 2009/0079396 A1* | 3/2009 | Osamura | 320/134 |
| 2009/0146534 A1 | 6/2009 | Reichmann et al. | |
| 2009/0152986 A1 | 6/2009 | Beery et al. | |
| 2009/0200985 A1* | 8/2009 | Zane et al. | 320/108 |
| 2009/0230924 A1* | 9/2009 | Wright | 320/148 |
| 2010/0045241 A1* | 2/2010 | Nousiainen | 320/137 |
| 2010/0060231 A1* | 3/2010 | Trainor et al. | 320/103 |
| 2010/0060244 A1* | 3/2010 | Kurokawa et al. | 320/166 |
| 2010/0237829 A1* | 9/2010 | Tatebayashi et al. | 320/118 |

OTHER PUBLICATIONS

"Adaptive Piezoelectric Energy Harvesting Circuit for Wireless Remote Power Supply" by Ottman et al., IEEE Transactions on Power Electronics, vol. 17, No. 5, Sep. 2002, pp. 669-676.
A comparison between several vibration-powered piezoelectric generators for standalone systems, by Lefeuvre et al., Sensors and Actuators A 126, 2006, pp. 405-416.
PCT Search Report.

* cited by examiner

*Primary Examiner* — Edward Tso
*Assistant Examiner* — Alexis Boateng
(74) *Attorney, Agent, or Firm* — William B. Kempler; Wade J. Brady, III; Frederick J. Telecky, Jr.

(57) ABSTRACT

A system (1-2) for efficiently transferring harvested vibration energy to a battery (6) includes a piezo harvester (2) generating an AC output voltage ($V_P(t)$) and current ($I_{PZ}(t)$) and an active rectifier (3) to produce a harvested DC voltage ($V_{hrv}$) and current ($I_{hrv}$) which charge a capacitance (C0). An enable circuit (17) causes a DC-DC converter (4) to be enabled, thereby discharging the capacitance into the converter, when a comparator (A0,A1) of the rectifier which controls switches (S1-S4) thereof detects a direction reversal of the AC output current ($I_{PZ}(t)$). Another comparator (13) causes the enable circuit (17) to disable the converter (4) when the DC voltage exceeds a threshold ($V_{REF}$), thereby causing the capacitance be recharged.

10 Claims, 4 Drawing Sheets

CONVERTER AND METHOD FOR EXTRACTING MAXIMUM POWER FROM PIEZO VIBRATION HARVESTER

BACKGROUND OF THE INVENTION

The present invention relates generally to efficient transfer of power from a piezo vibration harvester to a DC-DC converter, and more particularly to an improved DC-DC converter circuit for efficiently receiving a maximum amount of power from a piezo harvester.

Recently, various very low power integrated circuits that require extremely low amounts of operating current (often referred to as "nano-power" integrated circuits) have been developed which can be powered by very small amounts of power scavenged or harvested from ambient solar, vibrational, thermal, and/or biological energy sources by means of micro-energy harvesting devices. The harvested power then usually is stored in batteries or supercapacitors. (The term "nano-power" as used herein is intended to encompass circuits and/or circuit components which draw DC current of less than roughly 1 microampere.)

Figure 1A:
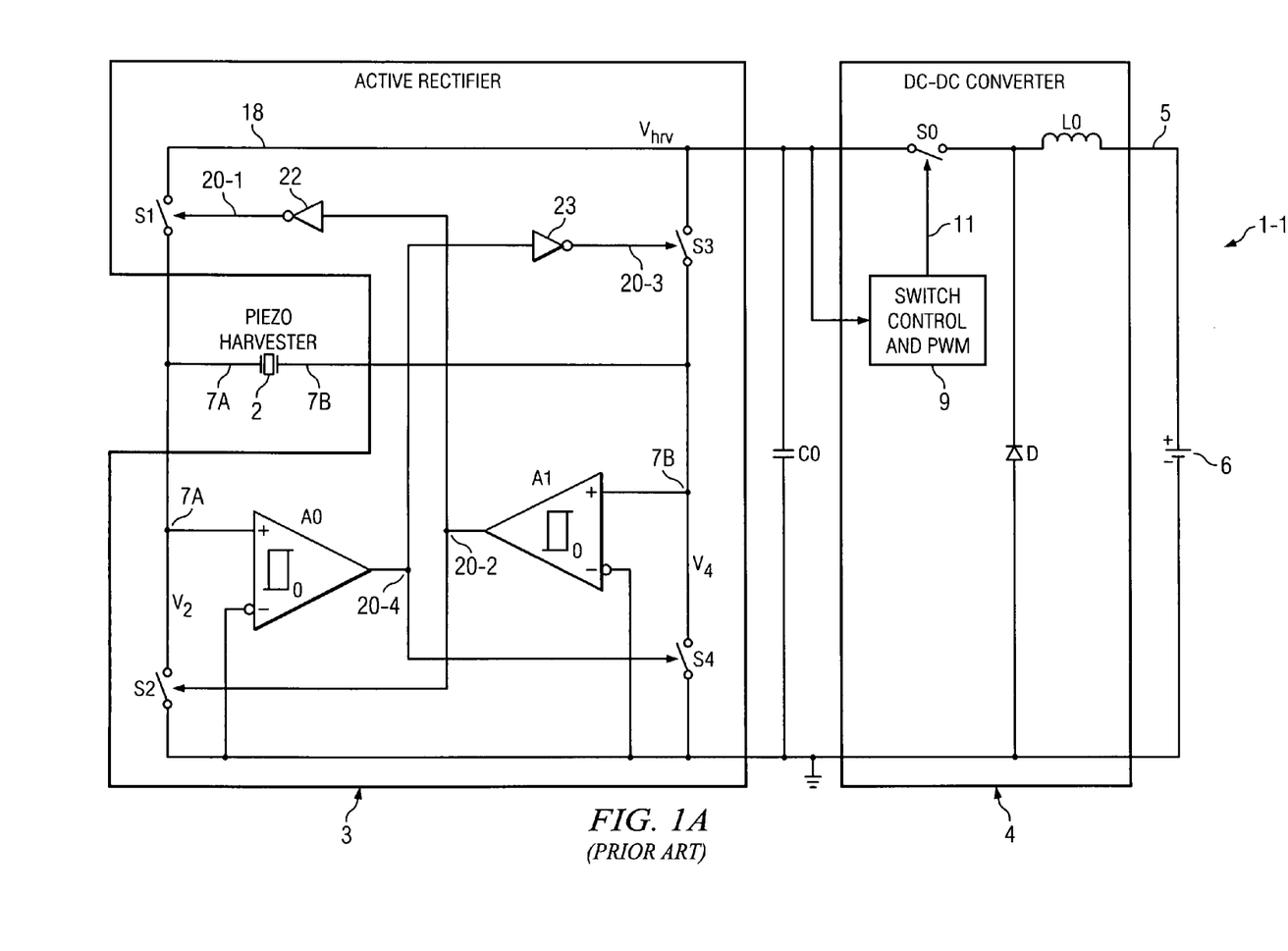
FIG. 1A is a schematic diagram of a prior art energy harvesting system including a piezo harvester and a DC-DC converter arranged to charge a battery.
Figure 1B:
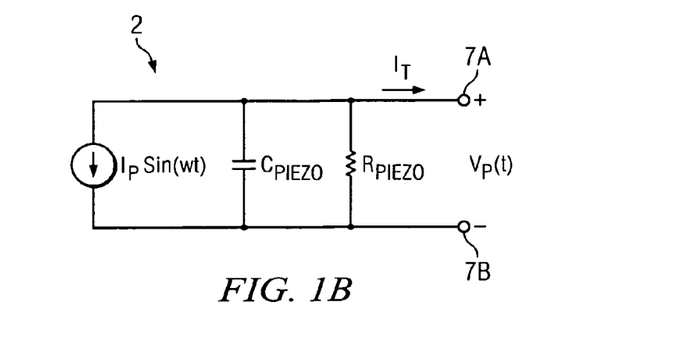
FIG. 1B shows a model of the piezo harvester 2 in FIG. 1A.

FIG. 1A shows an energy harvesting system 1-1 that includes a conventional piezo-electric harvester 2, an active rectifier circuit 3, and a DC-DC converter 4 for charging a battery or supercapacitor 6 and/or a load (not shown) which includes a switch control and PWM (pulse width modulation) circuit 9. Rectifier circuit 3 includes four switches S1-S4, two comparators A0 and A1, and two inverters 22 and 23. Active rectifier circuit 3 generates a harvested voltage $V_{hrv}$ on conductor 18 which is applied to an input of switch control and PWM circuit 9 of DC-DC converter 4. DC-DC converter 4 generates an output voltage and output current which are supplied by conductor 5 to the battery 6. The (+) input of comparator A1 controls the control terminals of switches S1 and S2, and the (+) input of comparator A0 controls the control terminals of switches S3 and S4. As indicated in FIG. 1B, harvester 2 can be modeled as a parallel connection of a sinusoidal current source, an internal capacitance $C_{PIEZO}$, and an internal resistance $R_{PIEZO}$.

An optional filtering capacitor C0 may be connected between conductor 18 and ground. Piezo energy harvesters always have an output capacitance $C_{PIEZO}$, which is not necessarily smaller than C0, depending on the brand or kind of harvester being used. Typically, DC-DC converter 4 in FIG. 1A is 80-90% efficient in transferring energy from conductor 18 to battery 6.

Figure 2:
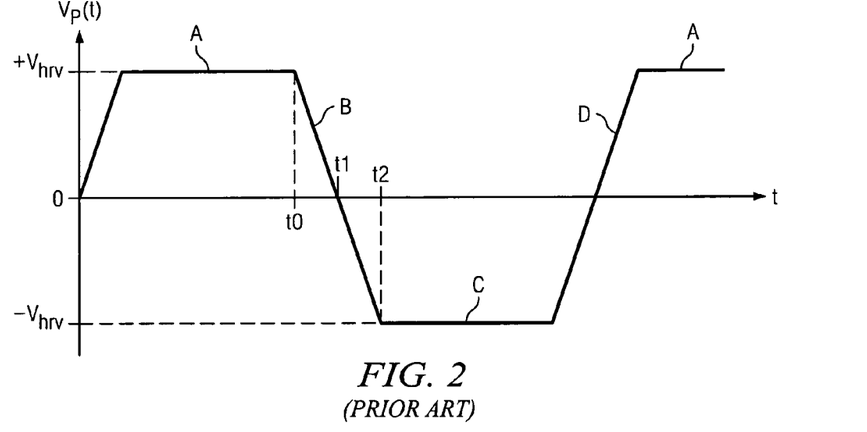
FIG. 2 is a graph useful in explaining the wasted energy in the energy harvesting system of FIG. 1A.

Referring to FIG. 2, the waveform represents the actual voltage $V_P(t)$ across piezo harvester 2. $+V_{hrv}$ and $-V_{hrv}$ are threshold voltages of the DC-DC converter, which may be determined by a maximum power point tracking (MPPT) circuit (not shown). For values of $V_{hrv}$ less than $+V_{hrv}$, DC-DC converter 4 is in its "off" condition in which it does not convert $V_{hrv}$, and vibration energy is being wasted for recharging of the harvester output capacitance $C_{PIEZO}$.

For values of the harvester output voltage $V_P(t)$ between $+V_{hrv}$ and $-V_{hrv}$, energy generated by piezo harvester 2 is wasted by the charging and discharging of the capacitance $C_{PIEZO}$. (Note that capacitor C0 is connected to the output of rectifier 3 and therefore is not charged and recharged by piezo harvester 2.) That energy is lost during the time interval between time t0 and t2 of transition B of the $V_P(t)$ waveform shown in FIG. 2. During the voltage levels $+V_{hrv}$ and $-V_{hrv}$ at the input of active rectifier 3, vibration energy recharges $C_{PIEZO}$ but that energy cannot be collected by DC-DC converter 4 and therefore is wasted. Piezo harvesters with the structure shown in FIG. 1A are able to actually collect less than ⅓ of the energy available from piezo harvester 2. See the article "A Comparison Between Several Vibration-Powered Piezo Electric Generators for Stand-Alone Systems" by E. Lefeuvere, A. Badel, C. Richard, L. Petit, and D. Guyomar, 2005, Science Direct, Sensors and Actuators A 126 (d006) 405-416, available online at www-.sciencedirect.com; especially see FIGS. 6 and 7.

Before energy can enter harvester output capacitance $C_{PIEZO}$ and filter capacitance C0, the voltage $V_P(t)$ across piezo harvester 2 should reach the input threshold $+V_{hrv}$ of DC-DC converter 4. At the end of the present vibration half-cycle and the beginning of the next one, the total harvester output capacitance, including $C_{PIEZO}$, must be recharged to $-V_{hrv}$. This recharging energy (i.e., the subsequently mentioned $CV^2$ energy) is supplied by the mechanical vibration source and the piezo harvester 2 receiving that vibration, but the recharging energy is wasted every vibration cycle.

Generally, in order to maximize power transfer from piezo harvester 2 into DC-DC converter 4, the equivalent output impedance of piezo harvester 2 should match the input impedance of DC-DC converter 2. The input impedance of DC-DC converter 4 is equal to $$Z_{IN} \sim V_{hrv}/I_{L0(average)},$$

wherein $I_{L0(average)}$ is the average current through the inductor L0 of DC-DC converter 4. This means that the amplitude of $V_{hrv}$ should be proportional to the vibration amplitude, and therefore it is not possible to minimize the amount of waste from the collected energy by choosing smaller $V_{hrv}$ (because the amount of wasted energy $CV^2/2$ is proportional to the square of the voltage across the capacitance).

To avoid having to waste the $CV^2$ energy from piezo harvester 2 while switching its total output capacitance $C_{PIEZO}$ from $+V_{hrv}$ to $-V_{hrv}$, a known technique can be used to increase the amount of energy collected from the piezo harvester. That technique is to connect a switch across piezo harvester 2 and briefly short-circuit it at time t0 in FIG. 2 until the voltage $V_P(t)$ goes through zero. This counterintuitive technique of dissipating collectible energy can improve the amount of charging of battery 6 because the amount of wasted power from piezo harvester 2 is reduced by a factor of 2. This avoids the need to waste the $CV^2$ energy to recharge $C_{PIEZO}$. Furthermore, use of a large inductor in series with the foregoing switch can further enhance the efficiency of power transfer from the piezo harvester to the battery.

Thus, there is an unmet need an improved circuit and method for extracting a maximum amount of power from a piezo energy harvester.

There also is an unmet need for an improved implementation of a piezo energy harvesting system that avoids the large amounts of power wasted in prior piezo energy harvesting systems.

There also is an unmet need for an improved implementation of a circuit and method for increasing the efficiency of a piezo energy harvesting system without use of additional switches and/or inductors.

SUMMARY OF THE INVENTION

It is an object of the present invention to provide an improved implementation of a piezo energy harvesting system that avoids large amounts of power wasted in prior piezo energy harvesting systems.

It is another object of the invention to provide an improved implementation of a circuit and method for increasing the efficiency of a piezo energy harvesting system without use of additional switches and/or inductors.

Briefly described, and in accordance with one embodiment, the present invention provides a system (1-2) for efficiently transferring harvested vibration energy to a battery (6). The system includes a piezo harvester (2) generating an AC output voltage ($V_P(t)$) and current ($I_{PZ}(t)$) and an active rectifier (3) to produce a harvested DC voltage ($V_{hrv}$) and current ($I_{hrv}$) which charge a capacitance (C0). An enable circuit (17) causes a DC-DC converter (4) to be enabled, thereby discharging the capacitance into the converter, when a comparator (A0,A1) of the rectifier which controls switches (S1-S4) of the rectifier detects a direction reversal of the AC output current ($I_{PZ}(t)$). Another comparator (13) causes the enable circuit (17) to disable the converter (4) when the DC voltage exceeds a threshold ($V_{REF}$), thereby causing the capacitance be recharged.

In one embodiment, the invention provides a piezo energy harvesting system (1-2) coupled to a vibration source. The piezo energy harvesting system (1-2) includes a piezo harvester (2) for generating an output voltage ($V_P(t)$) and an output current ($I_{PZ}(t)$) representing energy harvested from the vibration source. An active rectifier (3) includes first (S1) and second (S2) switches coupled in series between a harvester output conductor (18) and a first reference voltage (GND) and third (S3) and fourth (S4) switches coupled in series between the harvester output conductor (18) and the first reference voltage (GND). A first comparator (A0) controls the third (S3) and fourth (S4) switches, and a second comparator (A1) controls the first (S1) and second (S2) switches. A first terminal (7A) of the piezo harvester (2) is coupled to a junction between the first (S1) and second (S2) switches and a first input (+) of the first (A0) comparator, and a second terminal (7B) of the piezo harvester (2) is coupled to a junction between the third (S3) and fourth (S4) switches and a first input (+) of the second (A1) comparator. The first (A0) and second (A1) comparators control rectifying of the harvester output current ($I_{PZ}(t)$) to charge a capacitance (C0) coupled between the harvester output conductor (18) and the first reference voltage (GND). The first (A0) and second (A1) comparators also generate output signals (20-4, 20-2) which indicate direction reversals of the output current ($I_{PZ}(t)$) of the piezo harvester (2). A DC-DC converter (4) has a first input coupled to the harvester output conductor (18), a second input coupled to the first reference voltage (GND), and an output (5) for supplying current to a battery (6). The DC-DC converter (4) includes an inductor (L0) coupled to the harvester output conductor (18), a fifth switch (S0) coupled to the inductor (L0), and a rectifying device (D) coupled to the inductor (L0). A third comparator (13) compares a voltage ($V_{hrv}$) on the harvester output conductor (18) with a second reference voltage ($V_{REF}$) to determine when to stop discharge of the capacitance (C0) into the inductor (L0). Enable circuitry (17) is coupled to the outputs (20-4,20-2) of the first (A0) and second (A1) comparators, respectively, for both starting discharge of the capacitance (C0) into the inductor (L0) and causing switching operation of the fifth switch (S0) to steer current in the inductor (L0) into the battery (6) in response to each direction reversal, so as to substantially eliminate waste of $CV^2$ power for recharging the capacitance ($C_{PIEZO}$) of the piezo harvester (2). The enable circuitry (17) operates as a state machine (FIG. 5) having a first state (A) in which an enable signal (EN) generated by the enable circuitry (17) is at a logical "1" level to enable the DC-DC converter (4) and a second state (B) wherein the enable signal (EN) is at a logical "0" level to disable the DC-DC converter (4). The enable logic circuit (17) switches from the first state (A) to the second state (B) in response to an output ($V_{16}$) of the third comparator (13) going from a "1" level to a "0" level. The enable logic circuit (17) switches from the second state (B) to the first state (A) in response to either the output ($V_{20-4}$) of the first comparator (A0) going from a "1" level to a "0" level or the output ($V_{20-2}$) of the second comparator (A1) going from a "1" level to a "0" level. In a described embodiment, the rectifying device (D) is a synchronous rectifier. The DC-DC converter (4) can be a boost converter, a buck converter, or a buck-boost converter.

In one embodiment, PWM (pulse width modulation) circuitry (14) is coupled between the output (EN) of the enable circuitry (17) and a control terminal of the fifth switch (S0). In one embodiment, each of the first (A0) and second (A1) comparators has a second input (−) coupled to the first reference voltage (GND). In one embodiment, PWM circuitry (14) causes the fifth switch (S0) to switch at a frequency of several megahertz when the output (EN) of the enable circuitry (17) is at a "1" level, and the PWM circuitry (14) also keeps the fifth switch (S0) open when the output (EN) of the enable circuitry (17) is at a "0" level. In a described embodiment, the DC-DC converter (4) is enabled for intervals (t1-t0 or t3-t2) which are less than approximately 100 microseconds.

In a described embodiment, the first comparator (A0) switches from a "1" state to a "0" state in response to a magnitude of the output current ($I_{PZ}(t)$) falling below a predetermined low value when the output current ($I_{PZ}(t)$) flows in a first direction, and wherein the second comparator (A1) switches from a "1" state to a "0" state in response to a magnitude of the output current ($I_{PZ}(t)$) falling below the predetermined low value when the output current ($I_{PZ}(t)$) flows in a second direction.

In one embodiment, the invention provides a method for efficiently transferring harvested vibration energy to a battery (6), including coupling the vibration energy to a piezo harvester (2) thereby causing the piezo harvester (2) to generate an AC output voltage ($V_P(t)$) and an AC output current ($I_{PZ}(t)$) that together constitute the harvested vibration energy; coupling the AC output voltage ($V_P(t)$) and AC output current ($I_{PZ}(t)$) to an active rectifier (3) and rectifying the AC output voltage ($V_P(t)$) and AC output current ($I_{PZ}(t)$) to produce a harvested DC output voltage ($V_{hrv}$) and a harvested DC output current ($I_{hrv}$); conducting the harvested DC output current ($I_{hrv}$) into a capacitance (C0) to charge the capacitance (C0) until the harvested DC output voltage ($V_{hrv}$) reaches a level at which a direction of the AC output current ($I_{PZ}(t)$) reverses; detecting the direction reversals by means of comparators (A0, A1) in the active rectifier (3); enabling a DC-DC converter (4) in response to the detecting to cause discharging of the capacitance (C0) into an inductor (L0) of the DC-DC converter (4) in response to each direction reversal; disabling the DC-DC converter (4) in response to a comparison of the harvested DC output voltage ($V_{hrv}$) with a reference voltage ($V_{REF}$) wherein the harvested DC output voltage ($V_{hrv}$) is less than the reference voltage ($V_{REF}$) to stop the discharging of the capacitance (C0) and cause recharging thereof; and enabling the DC-DC converter (4) by operating a switch (S0) of the DC-DC converter (4) to cause resulting current in the inductor (L0) to flow into the battery (6), the enabling including generating an enable signal (EN) by operating a state machine (17, FIG. 5) having a first state (A) in which the enable signal (EN) is at a logical "1" level to enable the DC-DC converter (4) and a second state (B) wherein the enable signal (EN) is at a logical "0" level to disable the DC-DC converter (4), wherein the state machine (17) switches from the first state (A) to the second state (B) in response to an output ($V_{16}$) generated by comparator (13) that performs the comparison going from a "1" level to a "0" level, and wherein the enable logic circuit (17) switches from the second state (B) to the first state (A) in response to the detecting of the direction reversal.

In one embodiment, the enabling includes operating PWM (pulse width modulation) circuitry (14) to cause a switch (S0) connected to the inductor (L0) in the DC-DC converter (4) to switch at a frequency of several megahertz when the enable signal (EN) is at a "1" level, and wherein the PWM circuitry (14) keeps the switch (S0) open when the enable signal (EN) is at a "0" level.

In one embodiment, the method provides a system (1-2) for efficiently transferring harvested vibration energy to a battery (6), including piezo harvester means (2) for receiving the vibration energy and a generating an AC output voltage ($V_P(t)$) and an AC output current ($I_{PZ}(t)$) that together constitute the harvested vibration energy; means (18) for coupling the AC output voltage ($V_P(t)$) and AC output current ($I_{PZ}(t)$) to active rectifier means (3) for rectifying the AC output voltage ($V_P(t)$) and AC output current ($I_{PZ}(t)$) to produce a harvested DC output voltage ($V_{hrv}$) and a harvested DC output current ($I_{hrv}$); means (18) for conducting the harvested DC output current ($I_{hrv}$) into a capacitance (C0) to charge the capacitance (C0) until the harvested DC output voltage ($V_{hrv}$) reaches a level at which a direction of the AC output current ($I_{PZ}(t)$) reverses; means (A0,A1) for detecting the direction reversal; means (A0, A1) for detecting the direction reversal; means (17) for enabling a DC-DC converter (4) in response to the detecting to cause discharging of the capacitance (C0) into an inductor (L0) of the DC-DC converter (4) in response to each direction reversal; and means (13,17) for disabling the DC-DC converter (4) in response to a comparison of the harvested DC output voltage ($V_{hrv}$) with a reference voltage ($V_{REF}$) wherein the harvested DC output voltage ($V_{hrv}$) is less than the reference voltage ($V_{REF}$).

DETAILED DESCRIPTION OF THE PREFERRED EMBODIMENTS

Figure 3A:
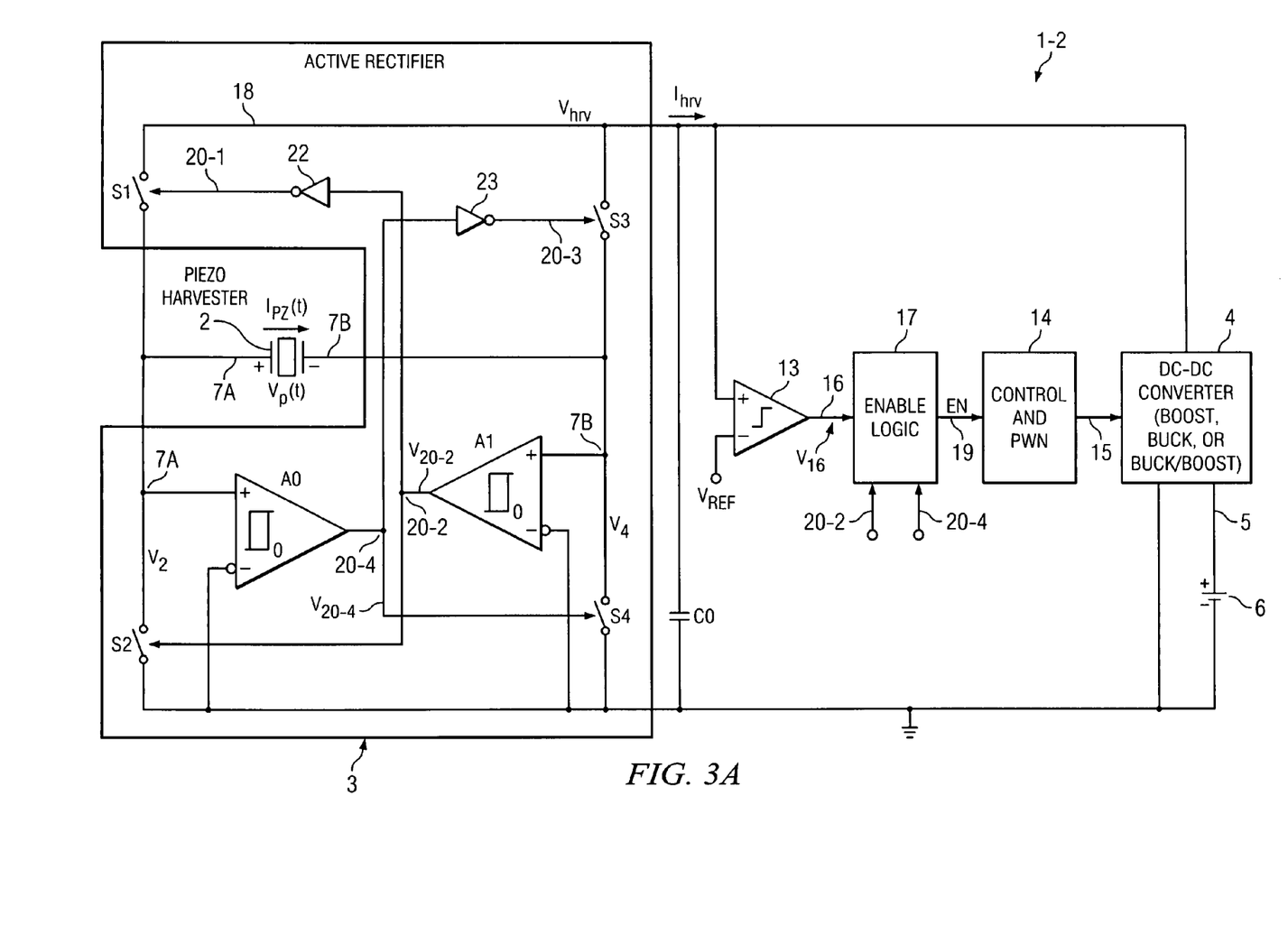
FIG. 3A is a schematic diagram of a piezo energy harvester system of the present invention.

FIG. 3A shows an energy harvesting system 1-2 that includes conventional piezo-electric harvester 2, active rectifier circuit 3, a comparator 13, an enable logic circuit 17, a switch control and PWM (pulse width modulation) circuit 14, and a DC-DC converter 4 for charging a battery or supercapacitor 6 and/or a load (not shown). As indicated in Prior Art FIG. 1B, piezo harvester 2 can be modeled as a parallel connection of a sinusoidal current source, internal capacitance $C_{PIEZO}$, and internal resistance $R_{PIEZO}$. Rectifier circuit 3 includes four switches S1-S4, two comparators A0 and A1, and two inverters 22 and 23. Piezo harvester 2 receives mechanical vibration energy or the like and converts it into a harvested AC voltage $V_P(t)$ across piezo harvester 2 and a harvested AC current $I_{PZ}(t)$ in its terminals 7A and 7B. Filtering capacitor C0 can be connected between conductor 18 and ground (i.e., $V_{SS}$).

In active rectifier 3, a first terminal of switch S1 is connected to conductor 18 on which the output $V_{hrv}$ of active rectifier is generated. A second terminal of switch S1 is connected by (+) terminal 7A of piezo harvester 2 to a first terminal of switch S2, the second terminal of which is connected to ground. Similarly, a first terminal of switch S3 is connected to conductor 18. A second terminal of switch S3 is connected by (−) terminal 7B of piezo harvester 2 to a first terminal of switch S4, the second terminal of which is connected to ground. Inverter 22 has its output 20-1 connected to the control terminal of switch S1. The input of inverter 22 is connected by conductor 20-2 to the control terminal of switch S2 and the output of comparator A1, which has its inverting input connected to ground. The non-inverting input of comparator A1 is connected to piezo harvester terminal 7B. Inverter 23 has its output connected by conductor 20-3 to the control terminal of switch S3. The input of inverter 23 is connected by conductor 20-4 to the control terminal of switch S4 and the output of comparator A0. The inverting input of comparator A0 is connected to ground, and its non-inverting input is connected to piezo harvester terminal 7A. Thus, the switch control circuitry of active rectifier 3 includes comparators A0 and A1 and inverters 22 and 23.

Figure 3B:
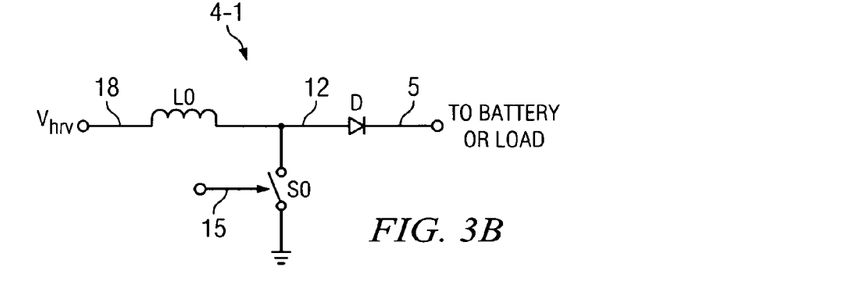
FIG. 3B is a schematic diagram of one basic implementation of DC-DC converter 4 in FIG. 3A.
Figure 3C:
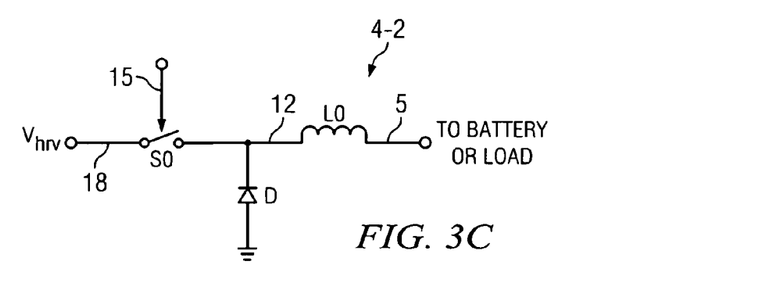
FIG. 3C is a schematic diagram of another basic implementation of DC-DC converter 4 in FIG. 3A.

The output conductor 18 of active rectifier 3 is connected to the high-side voltage input terminal of DC-DC converter 4, the output 5 of which is connected to battery 6. The low-side voltage input of DC-DC converter 4 is connected to ground. Conductor 18 also is connected to the (+) input of a comparator circuit 13. Active rectifier 3 generates a harvested DC output current $I_{hrv}$ in conductor 18 and a harvested DC output voltage $V_{hrv}$ on conductor 18. The (−) input of comparator circuit 13 is connected to a reference voltage $V_{REF}$, which can be zero or some other voltage. DC-DC converter 4 can be a boost converter as shown in FIG. 3B, a buck converter as shown in FIG. 3C, or a buck/boost converter (not shown). The presently preferred embodiment of DC-DC converter 4 is a boost converter, but it is expected that a future implementation will include a buck-boost converter.

FIG. 3B shows a simplified schematic diagram of a boost converter 4-1, wherein conductor 18 is connected to one terminal of inductor L0, the other terminal of which is connected by conductor 12 to one terminal of switch S0 and to the anode of a synchronous rectifier circuit represented by diode D. Inductor L0 typically has an inductance of 10 to 40 microhenrys. The anode of diode D is connected by conductor 5 to the battery 6. The other terminal of switch S0 is connected to ground. The control terminal of switch S0 is connected to the output 15 of control and PWM circuit 14 in FIG. 3A.

Alternatively, DC-DC converter 4 may be implemented by means of a buck converter 4-2, a simplified schematic diagram of which is shown in FIG. 3C, wherein conductor 18 is connected to one terminal of switch S0. The other terminal of switch S0 is connected by conductor 12 to one terminal of inductor L0 and to the cathode of a synchronous rectifier circuit represented by diode D. The other terminal of diode D is connected to ground. The other terminal of inductor L0 is connected by conductor 5 to the battery 6. The other terminal of diode D is connected to ground. The control terminal of switch S0 is connected to the output 15 of control and PWM circuit 14 in FIG. 3A. (Note that a buck-boost converter should be used if $V_{hrv}$ can be above the battery voltage.)

Figure 5:
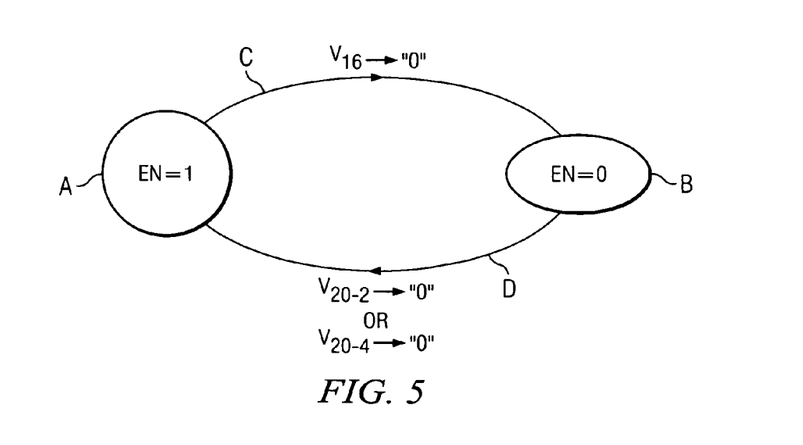
FIG. 5 is a state diagram for the enable logic in block 17 of FIG. 3A.

Referring again to FIG. 3A, the output 16 of comparator circuit 13 is connected to one input of an enable logic circuit 17. (A state diagram of the circuitry of enable logic circuit 17 is shown in FIG. 5, described below.) Two other inputs of enable logic circuit 17 are connected to the output 20-2 of comparator A1 and to the output 20-4 of comparator A0, respectively. Enable logic circuit 17 performs several functions, including removing/diminishing glitches which are associated with the signals $V_{16}$, $V_{20-2}$, and $V_{20-4}$ on conductors 16, 20-2, and 20-4, respectively, and generating the enable signal EN on conductor 19 in accordance with the state diagram shown in FIG. 5.

Referring to FIG. 5, the state diagram of enable logic circuit 17 in FIG. 3A includes a first state "A" in which the enable signal EN generated on conductor 19 is at a logical "1" level to enable DC-DC converter 4. Enable logic circuit 17 also has second state "B" wherein enable signal EN is at a logical "0" level. When enable logic circuit 17 is in state "A" and the condition "C" is met, i.e., when the comparator output $V_{16}$ on conductor 16 goes from a "1" level to a "0" level, then logic circuit 17 switches from state "A" in which EN is a "1" to state "B" in which EN is a "0", causing DC-DC converter 4 to be disabled. When enable logic circuit 17 is in state "B" and condition "D" is met, i.e., if either the output $V_{20-2}$ of comparator A1 goes from a "1" level to a "0" level or the output $V_{20-4}$ of comparator A0 goes from a "1" level to a "0" level, enable logic circuit 17 switches from state "B" to state "A", causing DC-DC converter 4 to be enabled.

Enable logic circuit 17 can be readily provided by implementing the simple state diagram of FIG. 5 as a simple state machine. For example, the state machine can be implemented using an edge-triggered flip-flop and a bit of associated logic circuitry.

Referring again to FIG. 3A, enable logic circuit 17 generates converter enable signal EN on conductor 19, which is connected to an input of control and PWM circuit 14. Control and PWM circuit 14 performs the functions of controlling DC-DC converter switches in order to determine and limit the current in inductor L0. The output 15 of control and PWM circuit 14 is coupled to the gate of the switch S0 (shown in FIG. 3B or FIG. 3C) that controls the flow of current in inductor L0 of DC-DC converter 4.

Figure 4:
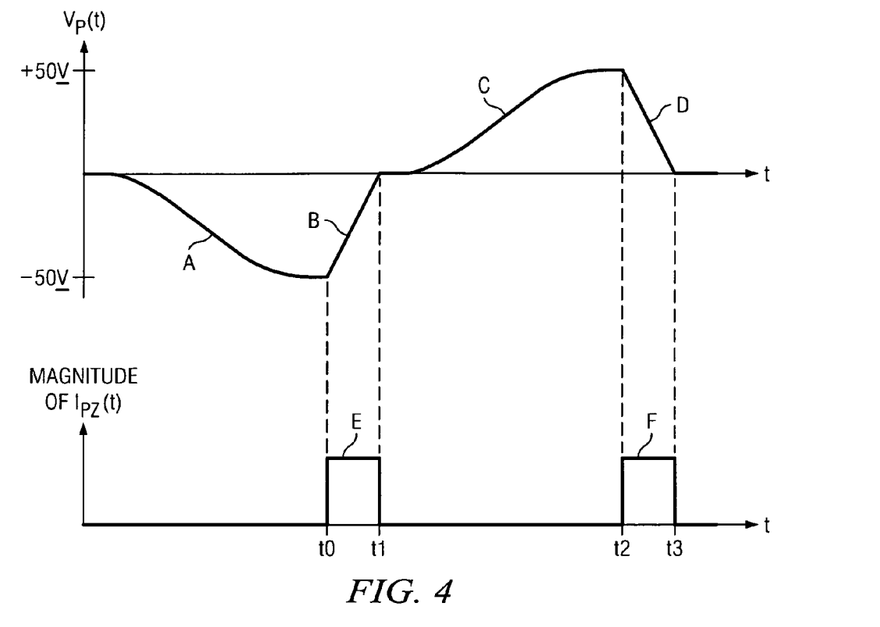
FIG. 4 is a graph useful in explaining the operation of the piezo energy harvester system of FIG. 3.

In operation, the logic level on the (+) input of comparator A1 in FIG. 3A controls the control terminals of switches S1 and S2, and the logic level on the (+) input of comparator A0 controls the control terminals of switches S3 and S4. Comparators A0 and A1 switch states when the magnitude of piezo harvester current $I_{PZ}(t)$ reaches a maximum or minimum value, and segment A of the $V_P(t)$ waveform in FIG. 4 shows how $V_P(t)$ decreases as $I_{PZ}(t)$ flows through switch S1 and charges capacitor C0 relatively slowly while switches S1 and S4 are closed and the other two switches S2 and S3 are open.

When the direction of $I_{PZ}(t)$ is reversed at time t0, segment B of the $V_P(t)$ waveform shows how capacitor C0 is relatively very rapidly discharged into inductor L0 (e.g., as shown in FIG. 3B or 3C). DC-DC converter 4 is enabled at time t0 and steers the inductor current into an output conductor 5 to charge battery 6. DC-DC converter 4 is disabled while C0 is discharged to 0 volts.

Similarly, when the direction of $I_{PZ}(t)$ is reversed at time t2 at the end of charging segment C, segment D of the $V_P(t)$ waveform shows how capacitor C0 is relatively very rapidly discharged into inductor L0. DC-DC converter 4 is enabled at time t2 and steers the inductor current into output conductor 5 to charge battery 6. DC-DC converter 4 is disabled while C0 is discharged to 0 volts.

The switch control circuitry including comparators A0 and A1 in active rectifier 3 of FIG. 3A determines the operation of switches S1-S4 so as to control the synchronous rectifying of the harvested AC signal $I_{PZ}(t)$ each time the magnitude of piezo harvester current $I_{PZ}(t)$ falls to zero while charging C0 and $C_{PIEZO}$ during the positive and negative phases of the present vibration cycle. Comparator A0 turns switch S4 off and turns switch S3 on (or comparator A1 turns switch S2 off and turns switch S1 on), and vibration energy imparted to piezo harvester 2, along with whatever amount of current $I_{hrv}$ piezo harvester 2 and active rectifier 3 continue to generate, are conducted to and stored in inductor L0 (e.g., as in FIG. 3B or 3C). In accordance with normal operation of DC-DC converter 4, the current stored in inductor L0 is steered into battery 6. Comparator 13 causes DC-DC converter 4 to be disabled if $V_{hrv}$ falls below $V_{REF}$. The foregoing process continues as long as adequately strong vibrations continue.

Enabling DC-DC converter 4 is a matter of allowing S0 to operate as required for normal DC-DC conversion operation. Disabling DC-DC converter 4 is simply a matter of keeping the switch S0 connected to inductor L0 in its OFF condition.

Thus, DC-DC converter 4 in FIG. 3A is controlled by sensing the direction of the current $I_{PZ}(t)$ in piezo harvester 2, which involves determining when either one of the outputs $V_{20-2}$ or $V_{20-4}$ goes to a "0" level. When the voltage $V_P(t)$ from piezo harvester 2 reaches its peak value, the piezo harvester current $I_{PZ}(t)$ reverses direction.

Advantageously, all of the current $I_{PZ}(t)$ being generated by piezo harvester 2 is used to recharge capacitances C0 and $C_{PIEZO}$, and essentially none of it is wasted, in contrast to the harvesting system of Prior Art FIG. 1A. During the short interval in which DC-DC converter 4 remains enabled (i.e., from time t0 to t1 in FIG. 3), all of the current being generated by piezo harvester 2 and essentially all of the charge currently stored in capacitors C0 and $C_{PIEZO}$ is rapidly discharged into inductor L0 of DC-DC converter 4. At the same time, in accordance with normal operation of DC-DC converter 4, the energy stored in inductor L0 of DC-DC converter 4 is steered into battery 6 while DC-DC converter 4 remains enabled. The vibration frequency typically is below about 2 kHz, and the switching frequency of DC-DC converter 4, established by control and PWM circuit 14, typically is several megahertz.

It can be readily shown, by analysis of the piezo harvesting systems shown in FIGS. 1A and 3A and the associated waveforms shown in FIGS. 2 and 4, that the piezo harvesting system 1-2 shown in FIG. 3A increases the efficiency of piezo energy harvesting by a factor of about 4 over the piezo harvesting system 1-1 in Prior Art FIG. 1A.

Referring to the waveforms in FIG. 4, by recharging capacitances C0 and $C_{PIEZO}$ via output conductor 18 of active rectifier 3 during segment A or segment C, depending on the polarity of the voltage of piezo harvester 2, the harvester output voltage $V_P(t)$ on conductor 18 increases until it reaches a maximum or minimum value. At that point, DC-DC converter 4 is effectively enabled by the enable signal EN generated by enable logic circuit 17, starting at time t0 and continuing until the time t1 at which $V_P(t)$ is equal to $V_{REF}$, which may be zero, which occurs when C0 and $C_{PIEZO}$ are completely discharged into inductor L0, if the vibration displacement is sufficient to cause $V_{hrv}$ to exceed $V_{REF}$. As the charged-up capacitances C0 and $C_{PIEZO}$ are being discharged into the inductor L0, the resulting current stored in inductor L0 is transferred into battery 6 according to the ordinary switching procedure of control and PWM circuit 14.

Specifically, during "charging segment" A of the $V_P(t)$ waveform in FIG. 4, active rectifier 3 is effectively disconnected from DC-DC converter 4, which is disabled. During charging segment A, the current $I_{PZ}(t)$ being generated by piezo harvester 2 charges up capacitances C0 and $C_{PIEZO}$. When the magnitude of $V_P(t)$ reaches its maximum as the diminishing magnitude of $I_{PZ}(t)$ reaches zero, DC-DC converter 4 is enabled in response to EN. Then during "discharging segment" B of the $V_P(t)$ waveform, capacitances C0 and $C_{PIEZO}$ are discharged into inductor L0 and control and PWM circuit 14 operate switch S0 so as to steer the current stored in inductor L0 into battery 6. Operation during charging segment C and discharging segment D is similar but for the opposite polarity of $V_P(t)$.

When piezo harvester voltage $V_P(t)$ reaches a peak magnitude, the corresponding $I_{PZ}(t)$ current direction reversal of $I_{PZ}(t)$ is detected as a reversal in the output of one of comparators A0 and A1. DC-DC converter 4 is immediately enabled in response to that $I_{PZ}(t)$ direction reversal.

During a vibration cycle, C0 and $C_{PIEZO}$ are connected in parallel, and the voltage $V_{hrv}$ across C0 is $C0/C_{PIEZO}$ times smaller than voltage $V_P(t)$ across the piezo harvester 2 while DC-DC converter 4 is disabled, i.e., effectively disconnected from piezo harvester 2, during the same vibration half cycle. If DC-DC converter 4 is implemented by means of boost converter 4-1 in FIG. 3B, $V_{hrv}$ is limited by the 3 to 4 volt voltage of battery 6, which is effectively short-circuited to conductor 18 through inductor L0. (See the above mentioned reference by Lefeuvere et al.

When DC-DC converter 4 is enabled, DC-DC converter 4 starts conducting a maximum allowed current (indicated by current pulses E and F in FIG. 4) into inductor L0 until C0 and $C_{PIEZO}$ are fully discharged, and at the same time the resulting current in inductor L0 is steered into battery 6 in accordance with the output of control and PWM circuit 14. Then DC-DC converter 4 is immediately disabled or effectively disconnected from $V_{hrv}$, until the end of the next vibration half cycle during which C0 and $C_{PIEZO}$ are being recharged by piezo harvester 2. The discharge time of C0 and $C_{PIEZO}$ is less than approximately 100 microseconds and therefore is negligible compared to the duration of the vibration cycle, which typically is less than roughly a few milliseconds. (The discharge time of C0 and $C_{PIEZO}$) typically is at least 100 times less than the vibration cycle (which is relatively much shorter than illustrated in FIG. 4).

The above described piezo energy harvesting system avoids the large amount of wasted power characteristic of the prior art shown in FIG. 1A by providing a new DC-DC converter structure including associated circuitry for extracting maximum power from piezo harvesters. This is accomplished by using an active rectifier which detects reversals in the direction of the current through the piezo harvester and utilizes that information to enable the DC-DC converter only as long as required to transfer all of the charge and current produced by the piezo harvester earlier in the present vibration half cycle. This is accomplished without use of additional switches.

Thus, vibration energy generated by piezo harvester 2 is fully utilized and no wasteful dissipation occurs. C0 is fully discharged each vibration cycle. This means that the input impedance of piezo harvester 2 is equal to $Rin\sim1/\omega C0$. The input impedance of DC-DC converter 4 can be matched to the output impedance of piezo harvester 2 by the appropriate choice of capacitance C0.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A system for efficiently transferring harvested vibration energy to an energy storage device including:
    (a) piezo harvester means for receiving vibration energy and generating an AC output voltage and an AC output current that together constitute the harvested vibration energy;
    (b) means for coupling the AC output voltage and AC output current to active rectifier means for rectifying the AC output voltage and AC output current to produce a harvested DC output voltage and a harvested DC output current;
    (c) means for conducting the harvested DC output current into a capacitance to charge the capacitance until the harvested DC output voltage reaches a level at which a direction of the AC output current reverses;
    (d) means for detecting the direction reversal;
    (e) means for enabling a DC-DC converter in response to the detecting to cause discharging of the capacitance into an inductor of the DC-DC converter in response to the direction reversal; and
    (f) means for disabling the DC-DC converter in response to a comparison of the harvested DC output voltage with a reference voltage wherein the harvested DC output voltage is less than the reference voltage,
    wherein the means for coupling comprise an active rectifier including first and second switches coupled in series between a harvester output conductor and a first reference voltage, third and fourth switches coupled in series between the harvester output conductor and the first reference voltage, a first comparator for controlling the third and fourth switches, and a second comparator for controlling the first and second switches, a first terminal of the piezo harvester being coupled to a junction between the first and second switches and a first input of the first comparator, and a second terminal of the piezo harvester being coupled to a junction between the third and fourth switches and a first input of the second comparator, wherein the first and second comparators control the rectifying of the harvester output current to charge a capacitance coupled between the harvester output conductor and the first reference voltage, and wherein the first and second comparators also generate output signals indicative of direction reversals of the output current of the piezo harvester.

2. A system for efficiently transferring harvested vibration energy to an energy storage device including:
    (a) piezo harvester means for receiving vibration energy and generating an AC output voltage and an AC output current that together constitute the harvested vibration energy;
    (b) means for coupling the AC output voltage and AC output current to active rectifier means for rectifying the AC output voltage and AC output current to produce a harvested DC output voltage and a harvested DC output current;
    (c) means for conducting the harvested DC output current into a capacitance to charge the capacitance until the harvested DC output voltage reaches a level at which a direction of the AC output current reverses;

(d) means for detecting the direction reversal;
(e) means for enabling a DC-DC converter in response to the detecting to cause discharging of the capacitance into an inductor of the DC-DC converter in response to the direction reversal; and
(f) means for disabling the DC-DC converter in response to a comparison of the harvested DC output voltage with a reference voltage wherein the harvested DC output voltage is less than the reference voltage,
wherein the means for conducting comprising a DC-DC converter having a first input coupled to the harvester output conductor, a second input coupled to the first reference voltage, and an output for supplying current to an energy storage device, the DC-DC converter including an inductor coupled to the harvester output conductor, a fifth switch coupled to the inductor, and a rectifying device coupled to the inductor.

3. A system for efficiently transferring harvested vibration energy to an energy storage device including:
(a) piezo harvester means for receiving vibration energy and generating an AC output voltage and an AC output current that together constitute the harvested vibration energy;
(b) means for coupling the AC output voltage and AC output current to active rectifier means for rectifying the AC output voltage and AC output current to produce a harvested DC output voltage and a harvested DC output current;
(c) means for conducting the harvested DC output current into a capacitance to charge the capacitance until the harvested DC output voltage reaches a level at which a direction of the AC output current reverses;
(d) means for detecting the direction reversal;
(e) means for enabling a DC-DC converter in response to the detecting to cause discharging of the capacitance into an inductor of the DC-DC converter in response to the direction reversal; and
(f) means for disabling the DC-DC converter in response to a comparison of the harvested DC output voltage with a reference voltage wherein the harvested DC output voltage is less than the reference voltage,
wherein the means for determining reversal comprising a third comparator for comparing a voltage on the harvester output conductor with a second reference voltage to determine when to stop discharge of the capacitance into the inductor.

4. A system for efficiently transferring harvested vibration energy to an energy storage device including:
(a) piezo harvester means for receiving vibration energy and generating an AC output voltage and an AC output current that together constitute the harvested vibration energy;
(b) means for coupling the AC output voltage and AC output current to active rectifier means for rectifying the AC output voltage and AC output current to produce a harvested DC output voltage and a harvested DC output current;
(c) means for conducting the harvested DC output current into a capacitance to charge the capacitance until the harvested DC output voltage reaches a level at which a direction of the AC output current reverses;
(d) means for detecting the direction reversal;
(e) means for enabling a DC-DC converter in response to the detecting to cause discharging of the capacitance into an inductor of the DC-DC converter in response to the direction reversal; and
(f) means for disabling the DC-DC converter in response to a comparison of the harvested DC output voltage with a reference voltage wherein the harvested DC output voltage is less than the reference voltage,
wherein the means for enabling any circuitry coupled to the outputs of the first and second comparators, respectively, for both starting the discharge of the capacitance into the inductor and causing switching operation of the fifth switch to steer current in the inductor into the energy storage device in response to each direction reversal to substantially eliminate waste of power for recharging the capacitance of the piezo harvester, wherein the enable circuitry operates as a state machine having a first state in which an enable signal generated by the enable circuitry is at a logical "1" level to enable the DC-DC converter and a second state wherein the enable signal is at a logical "0" level to disable the DC-DC converter, wherein the enable logic circuit switches from the first state to the second state in response to an output of the third comparator going from a "1" level to a "0" level, and wherein the enable logic circuit switches from the second state to the first state in response to either the output of the first comparator going from a "1" level to a "0" level or the output of the second comparator going from a "1" level to a "0" level.

5. A system for efficiently transferring harvested vibration energy to a battery including:
(a) piezo harvester means for receiving vibration energy and generating an AC output voltage and an AC output current that together constitute the harvested vibration energy;
(b) means for coupling the AC output voltage and AC output current to active rectifier means for rectifying the AC output voltage and AC output current to produce a harvested DC output voltage and a harvested DC output current, wherein the means for coupling comprise an active rectifier including first and second switches coupled in series between a harvester output conductor and a first reference voltage, third and fourth switches coupled in series between the harvester output conductor and the first reference voltage, a first comparator for controlling the third and fourth switches, and a second comparator for controlling the first and second switches, a first terminal of the piezo harvester being coupled to a junction between the first and second switches and a first input of the first comparator, and a second terminal of the piezo harvester being coupled to a junction between the third and fourth switches and a first input of the second comparator, wherein the first and second comparators control the rectifying of the harvester output current to charge a capacitance coupled between the harvester output conductor and the first reference voltage, and wherein the first and second comparators also generate output signals indicative of direction reversals of the output current of the piezo harvester;
(c) means for conducting the harvested DC output current into a capacitance to charge the capacitance until the harvested DC output voltage reaches a level at which a direction of the AC output current reverses, wherein the means for conducting comprising a DC-DC converter having a first input coupled to the harvester output conductor, a second input coupled to the first reference voltage, and an output for supplying current to a battery, the DC-DC converter including an inductor coupled to the harvester output conductor, a fifth switch coupled to the inductor, and a rectifying device coupled to the inductor;

(d) means for detecting the direction reversal wherein the means for detecting reversal comprising a third comparator for comparing a voltage on the harvester output conductor with a second reference voltage to determine when to stop discharge of the capacitance into the inductor;

(e) means for enabling a DC-DC converter in response to the detecting to cause discharging of the capacitance into an inductor of the DC-DC converter in response to the direction reversal, wherein the means for enabling any circuitry coupled to the outputs of the first and second comparators, respectively, for both starting the discharge of the capacitance into the inductor and causing switching operation of the fifth switch to steer current in the inductor into the battery in response to each direction reversal to substantially eliminate waste of power for recharging the capacitance of the piezo harvester, wherein the enable circuitry operates as a state machine having a first state in which an enable signal generated by the enable circuitry is at a logical "1" level to enable the DC-DC converter and a second state wherein the enable signal is at a logical "0" level to disable the DC-DC converter, wherein the enable logic circuit switches from the first state to the second state in response to an output of the third comparator going from a "1" level to a "0" level, and wherein the enable logic circuit switches from the second state to the first state in response to either the output of the first comparator going from a "1" level to a "0" level or the output of the second comparator going from a "1" level to a "0" level; and (f) means for disabling the DC-DC converter in response to a comparison of the harvested DC output voltage with a reference voltage wherein the harvested DC output voltage is less than the reference voltage.

6. An electronic device utilizing the system for efficiently transferring harvested vibration energy to an energy storage device of claim 1 further comprising:
   a piezoelectric energy harvester for generating electrical power coupled to an input of the system for efficiently transferring harvested vibration energy;
   a energy storage device coupled to an output of the system for efficiently transferring harvested vibration energy; and
   an electronic circuit consuming electric power generated by the piezoelectric energy harvester.

7. An electronic device utilizing the system for efficiently transferring harvested vibration energy to an energy storage device of claim 2 further comprising:
   a piezoelectric energy harvester for generating electrical power coupled to an input of the system for efficiently transferring harvested vibration energy;
   a energy storage device coupled to an output of the system for efficiently transferring harvested vibration energy; and
   an electronic circuit consuming electric power generated by the piezoelectric energy harvester.

8. An electronic device utilizing the system for efficiently transferring harvested vibration energy to an energy storage device of claim 3 further comprising:
   a piezoelectric energy harvester for generating electrical power coupled to an input of the system for efficiently transferring harvested vibration energy;
   a energy storage device coupled to an output of the system for efficiently transferring harvested vibration energy; and
   an electronic circuit consuming electric power generated by the piezoelectric energy harvester.

9. An electronic device utilizing the system for efficiently transferring harvested vibration energy to an energy storage device of claim 4 further comprising:
   a piezoelectric energy harvester for generating electrical power coupled to an input of the system for efficiently transferring harvested vibration energy;
   a energy storage device coupled to an output of the system for efficiently transferring harvested vibration energy; and
   an electronic circuit consuming electric power generated by the piezoelectric energy harvester.

10. An electronic device utilizing the system for efficiently transferring harvested vibration energy to a battery device of claim 5 further comprising:
    a piezoelectric energy harvester for generating electrical power coupled to an input of the system for efficiently transferring harvested vibration energy;
    a battery coupled to an output of the system for efficiently transferring harvested vibration energy; and
    an electronic circuit consuming electric power generated by the piezoelectric energy harvester.

* * * * *